(12) United States Patent
Maity et al.

(10) Patent No.: US 10,587,453 B2
(45) Date of Patent: Mar. 10, 2020

(54) METHOD AND APPARATUS FOR IPMI-BRIDGE-SERVER FOR NON-IPMI DEVICES

(71) Applicant: American Megatrends International, LLC, Norcross, GA (US)

(72) Inventors: Sanjoy Maity, Snellville, GA (US); Varadachari Sudan Ayanam, Suwanee, GA (US); Samvinesh Christopher, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 223 days.

(21) Appl. No.: 13/797,438

(22) Filed: Mar. 12, 2013

(65) Prior Publication Data

US 2014/0280814 A1 Sep. 18, 2014

(51) Int. Cl.
*H04L 12/24* (2006.01)

(52) U.S. Cl.
CPC ............... *H04L 41/0226* (2013.01)

(58) Field of Classification Search
CPC . H04L 41/0213; H04L 41/04; H04L 41/0226; H04L 41/022; H04L 41/00; H04L 41/0813; H04L 67/1097; H04L 67/125
USPC ........................................................ 709/223
See application file for complete search history.

(56) References Cited

U.S. PATENT DOCUMENTS

| | | | | |
|---|---|---|---|---|
| 6,601,119 B1* | 7/2003 | Slutz | ............... | G06F 13/38 710/104 |
| 7,027,808 B2* | 4/2006 | Wesby | ............... | G06Q 40/00 340/853.1 |
| 7,051,101 B1* | 5/2006 | Dubrovsky et al. | ............... | 709/225 |
| 7,523,185 B1* | 4/2009 | Ng | ............... | G06F 15/173 370/395.2 |
| 2005/0091438 A1* | 4/2005 | Chatterjee | ............... | G06F 13/409 710/315 |
| 2006/0052099 A1* | 3/2006 | Parker | ............... | H04L 65/1033 455/426.1 |
| 2009/0234903 A1* | 9/2009 | Lomelli et al. | ............... | 709/201 |

(Continued)

OTHER PUBLICATIONS

Intelligent Platform Management Interface Specification v1.5 (Feb. 20, 2002) by Intel, Hewlett-Packard, NEC, Dell (460 pages total).*

*Primary Examiner* — Tan Doan
(74) *Attorney, Agent, or Firm* — Locke Lord LLP; Tim Tingkang Xia, Esq.

(57) ABSTRACT

Certain aspects of the present disclosure are directed to an IPMI bridge server configured to expand the management functions of an IPMI control system to a plurality of non-IPMI protocol specific managed devices. The IPMI bridge server includes: a processor, a network interface controller assigned with a network address; and a memory containing a firmware. When the firmware is executed at the processor, it is configured to be in communication with a group of first protocol specific managed devices through a first protocol control point and a first communication link, and a group of second protocol specific managed devices through a second protocol control point and a second communication link, and to receive management requests each for performing a protocol specific management function at one of the group of first protocol specific managed devices or the group of second protocol specific managed devices.

19 Claims, 4 Drawing Sheets

(56) References Cited

U.S. PATENT DOCUMENTS

| | | | |
|---|---|---|---|
| 2009/0257345 A1* | 10/2009 | King | H04L 41/22 370/216 |
| 2011/0093575 A1* | 4/2011 | Dube | G06F 15/16 709/223 |
| 2012/0166605 A1* | 6/2012 | Chou | G06F 11/3006 709/223 |
| 2012/0297040 A1* | 11/2012 | Amano | 709/223 |
| 2013/0262642 A1* | 10/2013 | Kutch | H04L 67/125 709/223 |
| 2014/0215489 A1* | 7/2014 | Bhatia | G06F 9/546 719/313 |

* cited by examiner

METHOD AND APPARATUS FOR IPMI-BRIDGE-SERVER FOR NON-IPMI DEVICES

FIELD

The present disclosure generally relates to firmware of an IPMI Bridge Server, and more particularly to a method and an apparatus for IPMI-Bridge-Server for non-IPMI devices connected through wireless or wired communication network.

BACKGROUND

As the new technologies develop, more and more smart devices such as smart TVs, networked computers, tablet computers, digital media content servers and players, multimedia devices, etc, are being marketed in the recent years. Several communication protocols have been developed by related industries such that these smart devices may be easily managed and controlled. The communication protocols includes: Digital Living Network Alliance (DLNA), Digital Signage Device RS232 Control Standard (POPAI), Machine to Machine (M2M), and so on.

The DLNA is responsible for defining interoperability guidelines to enable sharing of digital media between multimedia devices. DLNA uses Universal Plug and Play (UPnP) for media management, discovery and control. UPnP defines the type of device that DLNA supports ("server", "renderer", "controller") and the mechanisms for accessing media over a network. The DLNA guidelines then apply a layer of restrictions over the types of media file format, encodings and resolutions that a device must support.

The Global Association for Marketing at Retail (POPAI) developed a Digital Signage Device RS-232 Control Standard for management of network connected digital signage display devices including electronic billboards, electronic signage displays, LCD, LED, plasma displays, or image projection devices commonly found in both public and private environments, including retail stores, hotel, restaurants and corporate buildings.

Machine to machine (M2M) refers to technologies that allow one M2M device to communicate to another device of same or similar capability through wireless and wired systems. M2M uses a device (such as a meter or camera) to capture an event (such as inventory level, alarm or emergency condition, etc.), which is relayed through a network (wireless, wired or hybrid) to an application (software program), that translates the captured event into meaningful information (for example, items need to be restocked, or ambulance or fire trucks to be dispatched). Such communication was originally accomplished by having a remote network of machines relay information back to a central hub for analysis, which would then be rerouted into a system like a remote management computer.

Most of these smart devices are commonly controlled or managed by network connected computers or servers, through the use of either proprietary or public domain software programs. However, these software programs are diverse and very difficult to manage and/or integrate. Many meters, sensors, and devices connected over wired or wireless networks require specific hardware and software to monitor supervise and manage. There is an associated cost for each individual device to be managed. On the other hand, IPMI protocol is used to manage various computer platforms and managing computer platform is very similar to the management of these smart devices. Therefore, if the IPMI technology can be expanded to the management of these smart devices, then the management of smart devices maybe accomplished by using existing IPMI technology to manage the smart devices by creating an IPMI Bridge Server to bridge the gap between IPMI and these smart devices.

Therefore, heretofore unaddressed needs still exist in the art to address the aforementioned deficiencies and inadequacies.

SUMMARY

Certain aspects of the present disclosure are directed to an IPMI bridge server configured to expand the management functions of an IPMI control system to a plurality of non-IPMI protocol specific managed devices. The IPMI bridge server includes: a processor, a network interface controller assigned with a network address; and a memory containing a firmware. When the firmware is executed at the processor, it is configured to be in communication with a group of first protocol specific managed devices through a first protocol control point and a first communication link, and a group of second protocol specific managed devices through a second protocol control point and a second communication link, and to receive management requests each for performing a protocol specific management function at one of the group of first protocol specific managed devices or the group of second protocol specific managed devices.

In certain embodiments, the firmware is configured to provide communication access for communicating with the group of first protocol specific managed devices and the group of second protocol specific managed devices and to translate IPMI messages directed to the group of first protocol specific managed devices and the group of second protocol specific managed devices. The firmware includes: (a) a management program configured to manage or perform management functions on the selected managed device according to its own communication protocol, (b) a system interface configured to receive and transmitting IPMI message with a local management computer, (c) a network interface configured to receive and transmitting IPMI message with a remote management computer, (d) an IPMI message module configured to process the incoming message from and outgoing message to the remote management computer and the local management computer, (e) a first protocol control point for receiving and transmitting the first protocol communication through a first communication link, (f) a second protocol control point for receiving and transmitting the second protocol communication through a second communication link, (g) a device database configured to store a customer management control function table, and property information of the group of first protocol specific managed devices and the group of second protocol specific managed devices, and (h) a SDR configured to store an inventory of the group of first protocol specific managed devices connected through the first communication link and the group of second protocol specific managed devices connected through the second communication link.

In certain embodiments, each of the management requests includes data for constructing an IPMI message in accordance with the IPMI communication protocol. The IPMI message includes at least a protocol specific IPMI OEM command, a device identifier of a selected managed device, a corresponding protocol command, a related command value. Each of the management requests is an IMPI message encapsulated in at least one network packet addressed to the network address. The firmware is configured to: (a) receive the network packet through the network interface controller and retrieve the IPMI message from the network packet through the IPMI message module, and (b) receive the network packet through the system interface and retrieve the IPMI message from the network packet through the IPMI message module.

In certain embodiments, each of a first protocol response message and a second protocol response is a protocol specific message encapsulated in at least one network packet addressed to the corresponding management request sender. The firmware is also configured to: (a) receive a first protocol response message from the group of first protocol specific managed devices through the first protocol control point and the first communication link, and generate an first IPMI response message through the IPMI message module, (b) receive a second protocol response message from the group of second protocol specific managed devices through the second protocol control point and then second communication link, and generate an second IPMI response message through the IPMI message module, and (c) send the first IPMI response message and the second IPMI response message back to the original management request sender.

In certain embodiments, the firmware is further configured to determine the selected managed device from the group of first protocol specific managed devices and the group of second protocol specific managed devices based on the customer management control function table and the inventory and property information stored in the device database. The customer management control function table and an inventory and property information are obtained through a discovery and provision process. The group of first protocol specific managed devices includes DLNA devices, M2M devices, or POPAI devices. The group of second protocol specific managed devices includes DLNA devices, M2M devices, or POPAI devices.

Certain aspects of the present disclosure are directed to a method for expanding management functions of an IPMI bridge server to a plurality of non-IPMI protocol specific managed devices. The method includes the steps of: (a) executing, at a processor of the IPMI bridge server, a program to be in communication with a group of first protocol specific managed devices through a first protocol control point and a first communication link, and a group of second protocol specific managed devices through a second protocol control point and a second communication link, and (b) receiving, at the program and through a network interface controller of the IPMI bridge server, management requests each for performing a protocol specific management function at one of the group of first protocol specific managed devices or the group of second protocol specific managed devices. The method also includes the steps of: (a) receiving, at the program, all out-of band communication messages directed to the group of first protocol specific managed devices, and the group of second protocol specific managed devices through network packets addressed to the same network address, (b) handling the network packets addressed to the network address by the network interface controller, and (c) translating IPMI messages directed to the group of first protocol specific managed devices and the group of second protocol specific managed devices.

In certain embodiments, each of the management requests includes data for constructing an IPMI message in accordance with the IPMI communication protocol. The IPMI message includes at least a protocol specific IPMI OEM command, a device identifier of a selected managed device, and a corresponding protocol command, and a related command value. Each of the management requests is an IMPI message encapsulated in at least one network packet addressed to the network address. The method includes the steps of: (a) receiving the network packet through the network interface controller and retrieve the IPMI message from the network packet through an IPMI message module, and (b) receiving the network packet through the system interface and retrieve the IPMI message from the network packet through the IPMI message module.

In certain embodiments, each of a first protocol response message and a second protocol response is a protocol specific message encapsulated in at least one network packet addressed to the corresponding management request sender. The method further includes the steps of: (a) receiving a first protocol response message from the group of first protocol specific managed devices through the first protocol control point and the first communication link, and generate an first IPMI response message through the IPMI message module, (b) receiving a second protocol response message from the group of second protocol specific managed devices through the second protocol control point and then second communication link, and generate an second IPMI response message through the IPMI message module, and (c) sending the first IPMI response message and the second IPMI response message back to the original management request sender. The group of first protocol specific managed devices includes DLNA devices, M2M devices, or POPAI devices. The group of second protocol specific managed devices includes DLNA devices, M2M devices, or POPAI devices.

Certain aspects of the present disclosure are directed to a non-transitory computer storage medium. The non-transitory computer storage medium stores computer-executable instructions. When the computer-executable instructions are executed by a processor of an IPMI bridge server, the instructions cause the processor to: (a) execute a program to be in communication with a group of first protocol specific managed devices through a first protocol control point and a first communication link, and a group of second protocol specific managed devices through a second protocol control point and a second communication link, and (b) receive, at the program and through a network interface controller of the IPMI bridge server, management requests each for performing a protocol specific management function at one of the group of first protocol specific managed devices or the group of second protocol specific managed devices.

In certain embodiments, the computer-executable instructions stored in the non-transitory computer storage medium, when executed, cause the processor to: (a) receive, at the program, all out-of band communication messages directed to the group of first protocol specific managed devices, and the group of second protocol specific managed devices through network packets addressed to the same network address, (b) handle the network packets addressed to the same network address by the same network interface controller, and (c) translate IPMI messages directed to the group of first protocol specific managed devices and the group of second protocol specific managed devices.

In certain embodiments, each of the management requests includes data for constructing an IPMI message in accordance with the IPMI communication protocol. The IPMI message includes at least a protocol specific IPMI OEM command, a device identifier of a selected managed device, a corresponding protocol command, and a related command value. Each of the management requests is an IMPI message encapsulated in at least one network packet addressed to the network address. Each of a first protocol response message and a second protocol response is a protocol specific message encapsulated in at least one network packet addressed to the corresponding management request sender. The computer-executable instructions stored in the non-transitory computer storage medium, when executed, also cause the processor to: (a) receive the network packet through the network interface controller and retrieve the IPMI message from the network packet through an IPMI message module, and (b) receive the network packet through the system interface and retrieve the IPMI message from the network packet through the IPMI message module, (c) receive a first protocol response message from the group of first protocol specific managed devices through the first protocol control point and the first communication link, and generate an first IPMI response message through the IPMI message module, (d) receive a second protocol response message from the group of second protocol specific managed devices through the second protocol control point and then second communication link, and generate an second IPMI response message through the IPMI message module, and (e) sending the first IPMI response message and the second IPMI response message back to the original management request sender. The group of first protocol specific managed devices includes DLNA devices, M2M devices, or POPAI devices. The group of second protocol specific managed devices also includes DLNA devices, M2M devices, or POPAI devices.

These and other aspects of the present disclosure will become apparent from the following description of the preferred embodiment taken in conjunction with the following drawings and their captions, although variations and modification therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
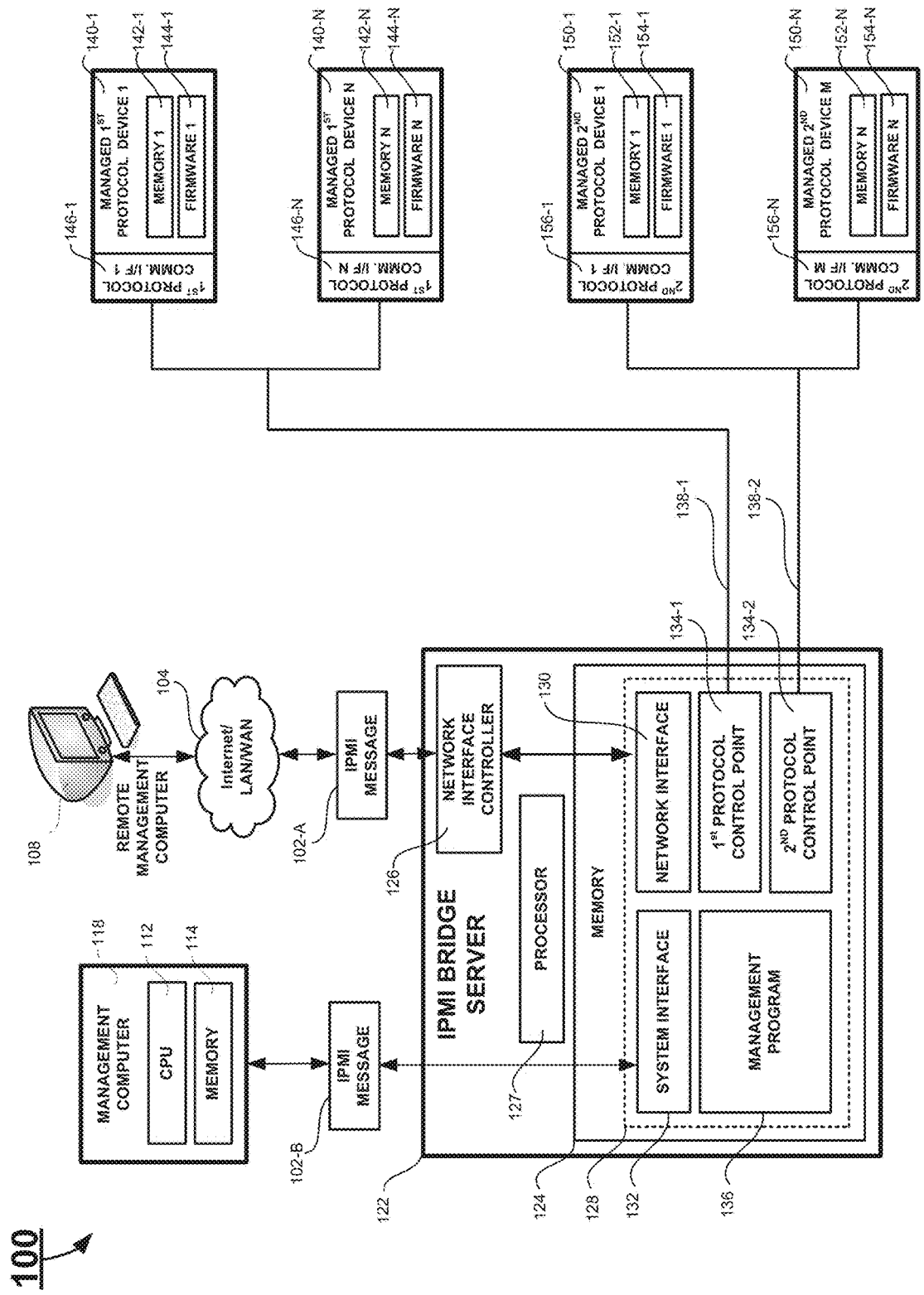
FIG. 1 schematically shows an IPMI Bridge Server for managing two groups of protocol specific managed devices according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-4, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

M2M technology, DLNA, Digital Signage Device RS-232 Control Standard, and other industrial protocols allow various devices to establish communication and exchange of information among themselves or with control servers. For example, the M2M interface allows business to monitor and manipulate remote equipment that is crucial to the business operation. The type of remote monitoring and control makes it possible for corporations to address service issues and restore functionality with little or not interruption in productivity. The DLNA interface allows businesses to manage multimedia contents. The RS-232 interface allows businesses to manage multimedia marketing display. These operations are quite similar to the remote monitoring and manipulation of computer platforms using IPMI technology. Using existing IPMI technology to monitor and control smart devices is a natural extension of the mature IPMI technology to the smart devices. An IPMI Bridge Server can be used to bridge the gap between the IPMI and smart devices through different protocols such as M2M, DLNA, and RS-232 protocols.

Referring to FIG. 1, a conceptual illustration of an IPMI Bridge Server system 100 is shown according to one embodiment of the present disclosure. The IPMI Bridge Server system 100 includes an IPMI Bridge Server 122, a group of first protocol specific managed devices 140-I, I=1, 2, . . . , N, a group of second protocol specific managed devices 150-J, J=1, 2, . . . , M, a remote management computer 108, and a network 104. Optionally, the IPMI Bridge Server system 100 may also include a local management computer 118 having a CPU 112, and a memory 114.

In certain embodiments, the IPMI Bridge Server 122 includes at least a processor 127, a memory 124, and a network interface controller 126. The memory 124 includes at least a firmware 128. The firmware 128 can have a system interface 132 for receiving an IPMI message 102-B from the local management computer 118, a network interface 130 for receiving an IPMI message 102-A from the remote management computer 108, a management program 136 for performing all management function of the IPMI Bridge Server 122 on the first and second group of protocol specific managed devices 140-I, I=1, 2, . . . , N and 150-J, J=1, 2, . . . , M, respectively, a first protocol control point 134-1 and a second protocol control point 134-2.

In one embodiment, the communication between the IPMI Bridge Server 122 and the remote management computer 108 is in accordance with the IPMI specification through either wired or wireless network connection 104.

In one embodiment, the communication between the IPMI Bridge Server 122 and the group of first protocol specific managed devices 140-I is in accordance with a first protocol specification through a first communication link 138-1.

In one embodiment, the communication between the IPMI Bridge Server 122 and the group of second protocol specific managed devices 150-J is in accordance with a second protocol specification through a second communication link 138-2.

In certain embodiments, the IPMI Bridge Server 122 can be a regular computer or a special purpose computer. The first protocol and the second protocol can be M2M, DLNA, or POPAI RS-232, and the protocol specific managed devices can be any type of M2M, DLNA, or POPAI RS-232 devices in each of the protocol groups.

The first and second communication links can be either wired network connection such as local network such as LAN, WAN, or as simple as a telephone line, or a RS-232 serial cable, or wireless network connection, such as mobile communication networks such as CDMA, GPRS cellular networks, or satellite communication network, or a combination of both wired and wireless.

The IPMI Bridge Server 122 may be a general purpose computer system. It should be appreciated that the IPMI Bridge Server 122 may alternatively be a "special purpose" computer system or a system that incorporates more than one interconnected system, such as a client-server network. Indeed, the IPMI Bridge Server 122 of FIG. 1 only represents an exemplary embodiment of the present disclosure, and therefore, should not be considered to limit the disclosure in any manner.

In one embodiment, the IPMI Bridge Server 122 can receive an external request such as an IPMI message 102-A through a network interface 130, which is in communication with the network interface controller 126, from the remote management computer 108 over the network 104. The network 104 can be the Internet, a local area network (LAN), a wide area network (WAN), or a Wi-Fi network. In another embodiment, the IPMI Bridge Server 122 can also receive an IPMI message 102-B from the locally connected management computer 118, through the system interface 132. The IPMI message 102-A or 102-B may include, among other things: (1) the source IP/MAC address, (2) a session ID, (3) a sequence number, (4) a Responder's Address, (5) the Responder's Logic Unit Number (LUN), (6) a Requester's Address, (7) the Requester's LUN, (8) actual command CMD, and (9) a message Channel number.

Figure 2:
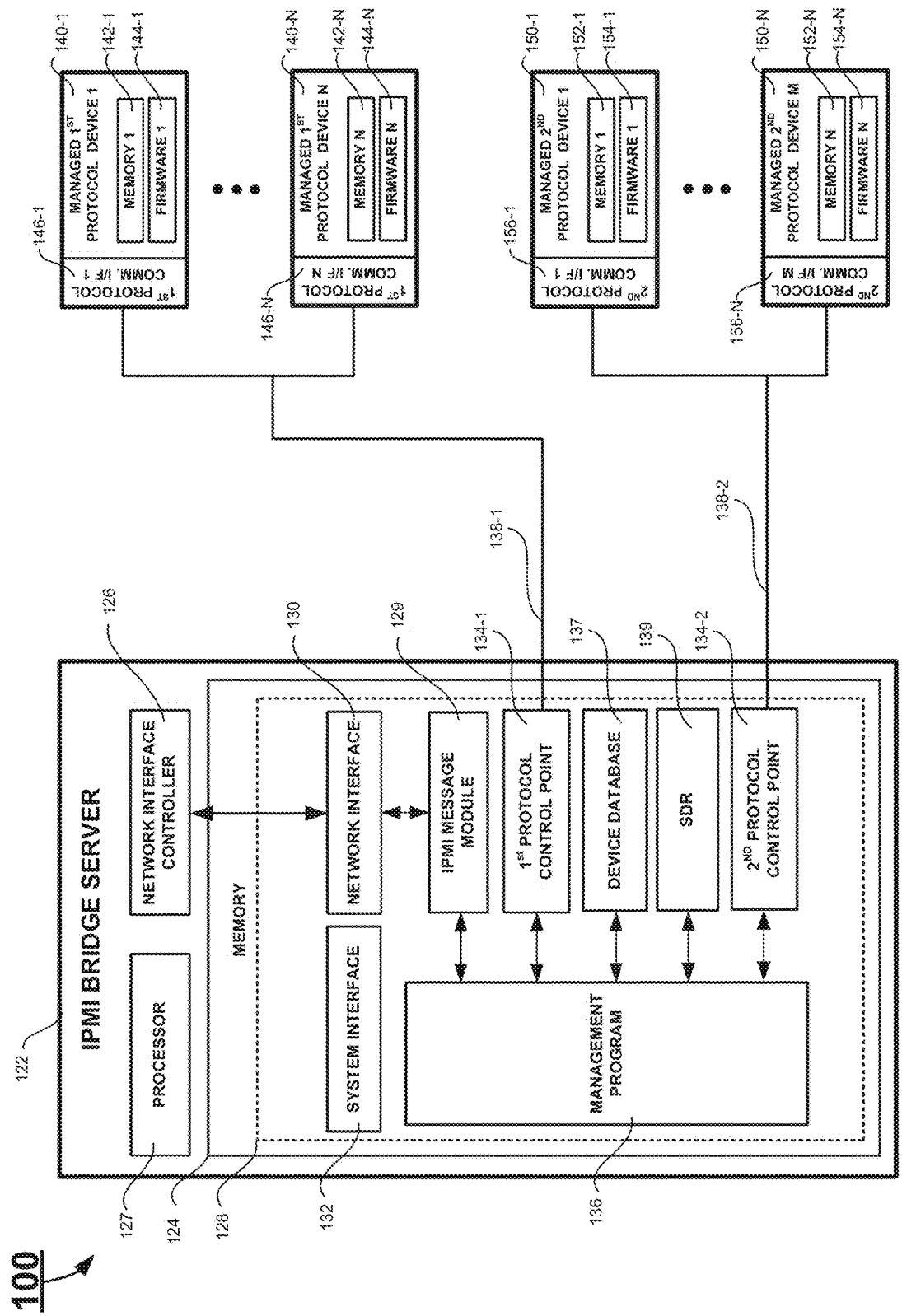
FIG. 2 schematically shows a detailed structure of the IPMI Bridge Server for managing two groups of protocol specific managed devices according to one embodiment of the present disclosure.

Referring now to FIG. 2, a detailed structure of the IPMI Bridge Server 122 for managing two groups of protocol specific managed devices is shown according to one embodiment of the present disclosure. The firmware 128, when executed, can include a management program 136, a system interface 132 for local management computer 118 to access the IPMI Bridge Server 122, a network interface 130 for the remote management computer 108 to access the IPMI Bridge Server 122, a sensor data record (SDR) 139, a device database 137, a first protocol control point 134-1 for communicating with the group of first protocol specific managed devices 140-I, and a second protocol control point 134-2 for communicating with the group of second protocol specific managed devices 150-J, respectively. The system interface 132 can include any system interface defined by the IPMI, such as a system interface, i.e., keyboard controller style ("KCS") interface, a USB interface, a system management interface chip ("SMIC") interface, a block transfer ("BT") interface, and SMBus System Interface (SSIF). The network interface 130 can also include a network interface such as an IPMI LAN interface. In one embodiment, the SDR 139 is used to keep an inventory of all devices connected either through the first communication protocol via the first protocol control point 134-1 and the first communication link 138-1 or the second communication protocol via the second protocol control point 134-2 and the second communication link 138-2. The device database 137 is used to store more detailed property information about each of the connected devices such as product specific information. For example, a network printer may have information such as IP address/device address, the communication protocol, manufacturer model number, the numbers and types of management function/operations available for the printer, the status of the printer, device driver type, device driver pointer, any alerts currently shown on the printer, the tuner usage, the paper usage etc. Standard IPMI SDR may not be suitable to store such detailed information. Therefore, such a database can be included in the firmware 128.

In one embodiment, each of the group of first protocol specific managed devices 140-I has a first protocol communication interface 146-I, a memory 142-I, and a firmware 144-I. Each of the group of second protocol specific managed devices 150-J has a second protocol communication interface 156-J, a memory 152-J, and a firmware 154-J. The first protocol control point 134-1 communicate with the group of first protocol specific managed devices 140-I through the first protocol communication interfaces 146-I via the first communication link 138-1. The second protocol control point 134-2 communicate with the group of second protocol specific managed devices 150-J through the second protocol communication interfaces 156-J via the second communication link 138-2. The connections between the first protocol control point 134-1 and the first protocol communication interfaces 146-I of the group of first protocol specific managed devices 140-I, and between the second protocol control point 134-2 and the second protocol communication interfaces 156-J of the group of first protocol specific managed devices 150-J can be either parallel, star shaped or serial. In one embodiment, for example, if the first protocol is POPAI RS-232 communication protocol, the connections between the first protocol control point 134-1 and the first protocol communication interfaces 146-I of the group of first protocol specific managed devices 140-I can be serial daisy chained. In another embodiment, if the second protocol is M2M communication protocol, the connections between the second protocol control point 134-2 and the second protocol communication interfaces 156-J of the group of second protocol specific managed devices 150-J can be star shaped through a wired/wireless router.

The management program 136 of the IPMI bridge server 122 monitors and manages the operations of the group of the first protocol specific managed devices 140-I and the second protocol specific managed devices 150-J. The management program 136 of the IPMI bridge server 122 receives an IPMI message 102-A from the network interface 130, or an IPMI message 102-B from the system interface 132 as shown in FIG. 1. The IPMI message contains devices specific management information and the IPMI message is generated by a client user interface application running on the remote management computer 108 or local management computer 118.

Figure 3:
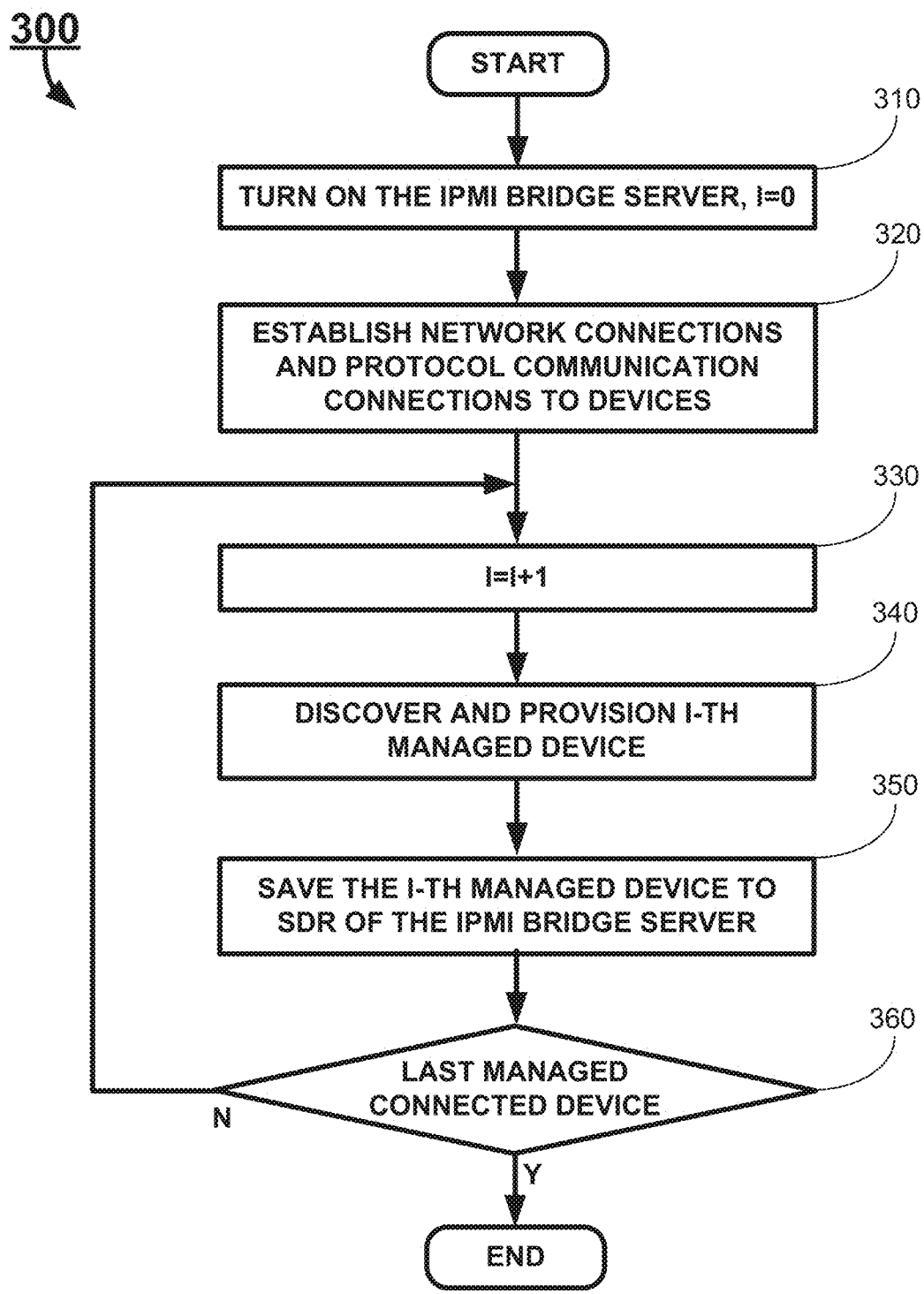
FIG. 3 shows an exemplary flow chart for the IPMI Bridge Server to discover all connected managed devices according to one embodiment of the present disclosure.

Before a user starts to monitor and manage the all managed devices, the client user interface application needs to know what type of the devices are connected to the IPMI bridge server 122. This information is collected through a discovery and provision process 300 as shown in FIG. 3. The DLNA protocol that utilizes Universal Plug and Play (UPnP) protocol is used here as an illustration for device discovery. Other protocol such as M2M, or POPAI will have similar discovery process and this information is known to the people skilled in the art, and will not be discussed in detail here.

Referring now to FIGS. 1-3, in the following discussion, the DLNA protocol is used as the first communication protocol, and the group of the first protocol specific managed devices 140-I, I=1, 2, . . . , N are all DLNA devices, such as a Home Audio System, a LED TV, an AV receiver, an home theater system etc. These devices are Universal Plug and Play (UPnP) devices and each device must implement a DHCP client. As soon as one such device is connected to a first protocol network, it searches for a DHCP server. The first control point 134-1 of the IPMI bridge server 122 includes a DHCP server to allow all connected devices to the first protocol network through the first communication link 138-1 to be discovered by the management program 136 of the IPMI bridge server 122. Once the DHCP server is informed that a new device is connected to the first protocol network, an IP address is assigned to the new device.

After a device has established an IP address, the IP address for the device can be registered in a sensor data record (SDR) of the IPMI bridge server 122. The management program 136 of the IPMI bridge server 122 uses a Simple Service Discovery Protocol (SSDP) protocol to discover all devices connected to the first protocol network. When a device is added to the first protocol network, that device uses SSDP messages to advertise its services to control points on the network. Similarly, when a control point is added to the network, that control point uses SSDP messages to search for devices of interest on the network. The fundamental exchange in both cases is a discovery message containing a few essential specifics about the device or one of its services, for example, its type, identifier, and a pointer to more detailed property information. The management program 136 goes through each one of the connected devices as shown in FIG. 3.

At the STEP 310, the IPMI bridge server 122 is turned on, and its device counter I is set to zero.

At the STEP 320, The IPMI bridge server 122 first establish the network connection to the network 104, and establish the first protocol communication connection to the group of first protocol specific managed devices 140-I connected to the first protocol network through first communication link 138-1.

At the STEP 330, increment the device counter I=I+1.

At the STEP 340, the I-th managed device is discovered and provisioned.

At the STEP 350, simple device information such as IP address, the name of the device, the model number, I-th managed device is discovered and provisioned. The detailed device property information may be collected through query process to each individual device through the communication protocol and saved in the device database 137.

At the STEP 360, if there are more devices to be discovered, continue to the STEP 330, and if it is the last devices in the SDR, then the process of discovery and provision is completed.

In one embodiment, the device database 137 is a portion of non-volatile memory of the memory 124. After the inventory of the connected devices are stored in the SDR 139 and the properties of the connected devices are stored in the device database 137, the management program 136 may provide the inventory and the properties of the connected devices to the remote management computer 108 such that the device management application on the remote management computer 108 is aware the numbers, types of the connected devices, as well as the functionalities of these connected devices. IPMI messages may be used for the inventory and properties delivery to the device management application on the remote management computer 108.

The device management application on the remote management computer 108 uses the inventory and properties of the connected devices to formulate a user interface or graphical user interface (GUI) for a user to monitor and manage these connected devices. In one embodiment, the inventory information may include a device identification number (device ID), the type of device, the protocol used for this device. The property information may IP address/device address, the communication protocol, manufacturer model number, the numbers and types of management function/operations available for the device, the status of the device, device driver type, device driver pointer, any alerts currently shown on the device, and device specific information.

The device management application on the remote management computer 108 is developed based on a wide variety of potential protocol specific devices, and it utilizes the inventory and property information of the connected devices, the device management application on the remote management computer 108 will be able to provide the user a customized user interfaces for the connected devices. For example, after the user selects an LED TV as a managed device, then a user interface specific to this LED TV will be shown up in the user interface. In one embodiment, the user interface may display the type of the device, the model number, the status of the TV (on/off), any alerts associated with the TV, the input source (HDMI/Video/Cable/AV receiver), the input source selection, the TV specific control functions such as the brightness, contrast, color, audio volume, audio mute, close caption, picture in picture, etc. The user is able to monitor and manage this connected LED TV, and make adjustments if needed.

The device management application on the remote management computer 108 accepts the user control and management actions through the user interfaces and formulate an IPMI message to pass the management program 136 of the IPMI bridge server 122. Many of the managed devices are beyond the IPMI computer system interface intended, and the IPMI standard may not include specific management functions for the connected devices described above. However, IPMI extended commands may be used for such monitoring and management functions. According to the IPMI specifications, the command Ids C0h-FEh are reserved for OEM commands, and they will be used for extending the managed devices from computer system specific devices to non-computer system specific devices such as printer, TVs, multimedia servers. In one embodiment, a customer management control function table may be created to encode all OEM management and control functions for the device management application on the remote management computer 108, and the management program 136 of the IPMI bridge server 122. Based on the customer management control function table, the device management application on the remote management computer 108 can encode the OEM command in an IPMI message and sent to the management program 136 of the IPMI bridge server 122, and the management program 136 of the IPMI bridge server 122 is able to decode the OEM command and formulate a protocol specific command based on the OEM command, the inventory and property information stored in the device database 137 and send to the selected managed device through its corresponding protocol control point, and protocol communication link. In one embodiment, the OEM command encoded in the IPMI message may include the device identifier, the command ID, and an associated value. For example, if the user wants to turn up the volume of the a DLNA LED TV to 75%, then the devices identifier may be 02 09 with 02 indicating the specific protocol being DLNA and 09 being the specific device code, the OEM command ID E0 for turn up the volume of the LED TV, and the command value is 64h (75%).

The management program 136 of the IPMI bridge server 122 can be software stack that accept IPMI standard and OEM commands and translate these IPMI standard and OEM commands into a protocol specific command and send to the selected protocol specific device to instruct the device to perform one or more protocol specific management functions. In certain embodiments, when the firmware 128 executed by the processor 127, the processor 127 initiates the management program 136 to receive IPMI messages with IPMI OEM commands embedded according to the customer management control function table, and to generate a protocol specific command based on the customer management control function table, the inventory and property information stored in the device database 137.

In certain embodiments, the remote management computer 108 sends an IPMI message 102-A to the IPMI bridge server 122 through a network 104, the network interface controller 126, and the network interface 130. As shown in FIG. 2, an IPMI message module 129 is used to handle the first protocol IPMI messages received from the network interface 130 of the IPMI bridge server 122. The device identifier, the command ID, and the associated command value are extracted from the IPMI message, and passed to the management program 136 of the IPMI bridge server 122. The management program 136 then looks up in the customer management control function table, and the inventory and property information stored in the devices database, formulates a protocol specific command, and send to the selected managed device through its corresponding protocol control point and protocol communication link and the protocol communication interface of the selected managed device. The firmware of the selected managed device then executes the protocol specific management command and performs the management function received.

Some of the management function commands are one directional commands that do not require any responses, for example, turning managed devices on/off, changing volume, etc. Other commands such as query require the managed devices to provide a response, feedback, or notifications. Therefore, the selected managed device may send responses, feedback, or notifications in response to the management function performed back to the IPMI bridge server 122 through its protocol communication interface, the communication link, and the protocol control point. For management function commands addressed to individual managed device, the management program 136 may receive individual responses. For management function commands addressed to all managed devices, the management software 136 may receive separate response individually from each of the managed devices the commands addressed to.

If the management software 136 receives one or more responses/notifications, the management software 136 formulates an IPMI response message with the responses/notifications received, and sends the IPMI response message back to the remote management computer 108 through the IPMI message module, the network interface 130, the network interface controller 126, the network 104.

As shown in FIG. 1, IPMI bridge server 122 is divided into two sections, one section from all IPMI aware devices or components to the IPMI message module 129, and one section from the first and second protocol control points to their corresponding group of protocol specific managed devices. In one embodiment, the system interface 132 and the network interface 130 can include the IPMB interface, the ICMB interface, the KCS interface, the SMIC interface, the Block Transfer (BT) interface, the IPMI LAN interface, the SMBus system interface, the IPMI serial/modem interface.

In one embodiment, the first communication link 138-1 and the second communication link 138-2 can be a mobile communication network such as a CDMA, a GPRS mobile communication networks, or a satellite communication network. In another embodiment, the first communication link 138-1 and the second communication link 138-2 are wired communication networks such as a local area network (LAN), a wide area network (WAN), or a Wi-Fi network. In one embodiment, the first and second communication interfaces 146-1 and 146-2 can be a mobile communication network gateway. In another embodiment, the first and second M2M communication interfaces 146-I and 156-J can be a network router for a LAN, a WAN, or a Wi-Fi network. In one embodiment, the communications over the first and second communication links 138-1 and 138-2 are TCP/IP packets carrying protocol specific data and messages.

As an illustrative example, the management program 136 of the IPMI bridge server 122 can perform following functions:

(1) receiving an IPMI message 102-A having a device identifier, a command ID, and an associated command value from a remote management computer 108 to bridge an IPMB request to a group of protocol specific managed devices through the network interface controller 126;

(2) the IPMI message module 129 receives and extracts the embedded OEM command from the IPMI message 102-A and forwards the device identifier, the command ID, and the associated command value to the management program 136 of the IPMI bridge server 122.

(3) the management program 136 of the IPMI bridge server 122 generates a protocol specific command based on the device identifier, the command ID, and the associated command value, the inventory and property information stored in the device database 137;

(4) the management program 136 of the IPMI bridge server 122 sends the protocol specific command to the selected managed device through its corresponding protocol control point, its corresponding communication link, and its corresponding protocol communication interface;

(5) the firmware of the selected managed device executes the protocol specific command, and performs the management functions designated by the protocol specific command;

(6) the management program 136 of the IPMI bridge server 122 may receive a protocol specific response from the selected managed device, and the protocol specific response is forwarded to the IPMI message module 129 of the IPMI bridge server 122 to formulate an IPMI response message, containing the information requested by the remote management computer 108; and (7) the IPMI message module 129 sends the IPMI response message containing a response, or information requested by the remote management computer 108 to the remote management computer 108 through the network interface 130, the network interface controller 126, the network 104.

The network 104 may include a local area network (LAN), a wide area network (WAN), a mobile communication network, or a Wi-Fi network. Such networking environments are commonplace in offices, enterprise-wide computer networks, intranets, and the Internet. The remote management computer 108 may also be a smart phone, a tablet computer, a network connected computer, a server.

In certain embodiments, the IPMI bridge server 122 includes one or more operating systems as well as one or more application programs. The operating system comprises a set of programs that control operations of the managed M2M devices 140-I, the IPMI bridge server 122 and allocation of resources. The set of programs, inclusive of certain utility programs, may also provide a graphical user interface to a user. An application program is software that runs on top of the operating system software and uses computer resources made available through the operating system to perform application specific tasks desired by the user. The operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, the remote management computer 108 or the local management computer 118 may include a web browser (not shown in FIG. 1), such as the INTERNET EXPLORER web browser from MICROSOFT CORPORATION of Redmond, Wash., that enables the remote management computer 108 or the local management computer 118 to communicate over the Internet, local area network (LAN), wide area network (WAN) 104 with the IPMI bridge server 122.

Figure 4:
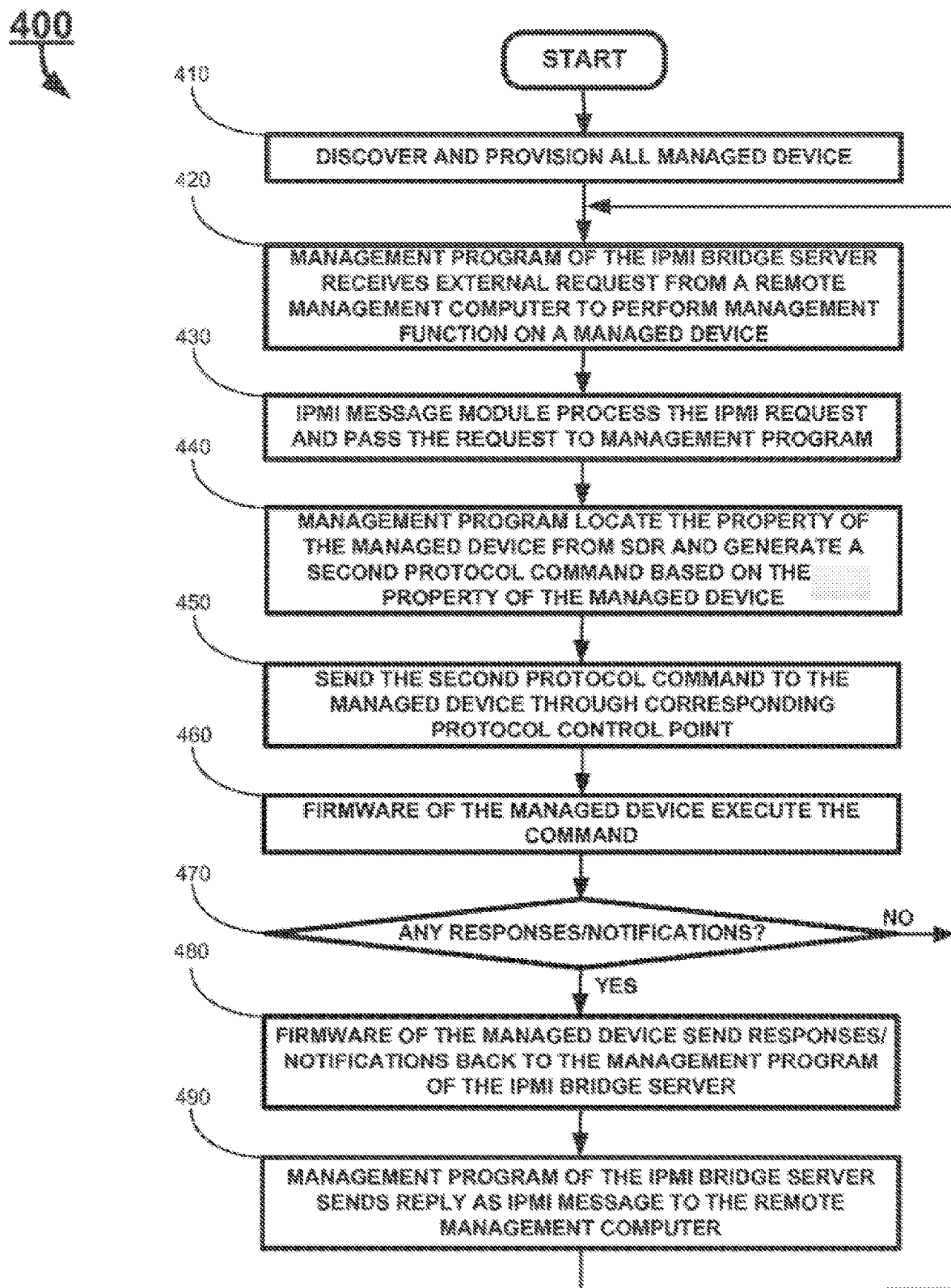
FIG. 4 shows an exemplary flow chart for the IPMI Bridge Server to perform a management function on a selected managed device according to one embodiment of the present disclosure.

FIG. 4 shows an exemplary flow chart for the IPMI Bridge Server to perform a management function on a selected managed device according to one embodiment of the present disclosure. At the start of the operation, a discovery and provision process 410 which was described in detail in FIG. 3 has to be performed as described above.

At STEP 420: the management program 136 of the IPMI bridge server 122 receives an IPMI request 102-A from a remote management computer 108 to instruct a selected managed device to perform a management function. An exemplary IMPI request includes one or more of: the source IP/MAC address, the Responder's Address, the Network function code, the Responder's LUN, the Requester's Address, the Requester's LUN, the command, and a protocol specific IPMI OEM command, the device identifier, and the command value.

At STEP 430, an IPMI message module processes the IMPI request and extracts the protocol specific IPMI OEM command, the device identifier, and the command value from the IPMI request, and forward to the management program 136 of the IPMI bridge server 122.

At STEP 440, the management program 136 of the IPMI bridge server 122 looks up the selected managed devices through an inventory and property database and a customer management control function table to generate a protocol specific command for performing the management function on the selected managed device based on the protocol specific IPMI OEM command.

At STEP 450, the protocol specific command is sent to the selected managed devices through its corresponding protocol control point, its corresponding communication link, and the protocol communication interface of the selected managed device.

At STEP 460, the firmware of the selected managed device executes the protocol specific command and performs the corresponding management function.

At STEP 470, based on the protocol specific command, the firmware of the selected managed device decides whether a response or notification is necessary. If there is no response/notification, it continues to the STEP 420 to wait for the next IPMI request. Otherwise, it continues to the STEP 480.

At STEP 480, the firmware of the selected managed device sends the response/notification back to the management program 136 of the IPMI bridge server 122 through the corresponding protocol communication interface of the selected managed device, the communication link, the protocol control point.

At STEP 490, the management program 136 of the IPMI bridge server 122 forwards the response/notification to the IPMI message module, and IPMI message module generates an IPMI response message based on the received response/notification, the inventory and property information, and the customer management control function table and sends the IPMI response message to the remote management computer 108 through the network interface 130, the network interface controller 126, the network 104. The management program 136 will continue to the STEP 420 to wait for the next IPMI request.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for expanding management functions of an Intelligent Platform Management Interface (IPMI) control system to a plurality of non-IPMI protocol specific managed devices, comprising:
   executing, at a processor of the IPMI control system, a program to be in communication with a group of first non-IPMI protocol specific managed devices through a first non-IPMI protocol control point and a first communication link, and a group of second non-IPMI protocol specific managed devices through a second non-IPMI protocol control point and a second communication link, wherein the program, when executed, defines:
      an IPMI-defined system interface configured to receive a first IPMI message from and transmit a second IPMI message to a local management computer; and
      a network interface configured to receive a third IPMI message from and transmit a fourth IPMI message to a remote management computer,
      wherein the system interface is separate and independent from the network interface; and
   receiving, at the program and through a network interface controller of the IPMI control system, IPMI management requests each for performing a non-IPMI protocol specific management function at one of the group of first non-IPMI protocol specific managed devices or the group of second non-IPMI protocol specific managed devices,
   wherein each of the IPMI management requests includes data for constructing one of the first and the third IPMI messages in accordance with IPMI communication protocol, the one of the first and the third IPMI messages including at least a protocol specific IPMI OEM command, a device identifier of a selected managed device, and a corresponding protocol command, and a related IPMI OEM command value, and
   wherein an IPMI message module is configured to receive the one of the first and the third IPMI messages, extract the at least the protocol specific IPMI OEM command, and forward the device identifier, the corresponding protocol command and the related IPMI OEM command value to a management program,
   wherein the management program accepts the one of the first and the third IPMI messages, translates the at least the protocol specific IPMI OEM command into a protocol specific command, sends the protocol specific command to the selected managed device, and instructs the selected managed device to perform one or more protocol specific management functions, and the management program further receives response from the selected managed device and formulates the response as one of the second and fourth IPMI messages to a corresponding management computer, and
   wherein the first communication link is a first bi-directional mobile communication network and the second communication link is a second bi-directional mobile communication network different from the first bi-directional mobile communication network, and each of the first bi-directional mobile communication network and the second bi-directional mobile communication network is selected from a group consisting of a Code Division Multiple Access (CDMA) communication network, a General Packet Radio Service (GPRS) mobile communication network, and a satellite communication network.

2. The method of claim 1, comprising:
receiving, at the program, all communication messages directed to the group of first non-IPMI protocol specific managed devices and the group of second non-IPMI protocol specific managed devices through network packets addressed to the same network address;
handling the network packets addressed to the same network address by the same network interface controller; and
translating IPMI messages directed to the group of first non-IPMI protocol specific managed devices and the group of second non-IPMI protocol specific managed devices.

3. The method of claim 2, wherein the each of the IPMI management requests is a fifth message encapsulated in at least one network packet addressed to the network address; the method comprising:
receiving the network packet through the network interface controller and retrieve the fifth IPMI message from the network packet through the IPMI message module; and
receiving the network packet through the system interface and retrieve the fifth IPMI message from the network packet through the IPM message module.

4. The method of claim 3, wherein each of a first non-IPMI protocol response message and a second non-IPMI protocol response is a non-IPMI protocol specific message encapsulated in at least one network packet addressed to the corresponding IPMI management request sender; the method comprising:
receiving a first non-IPMI protocol response message from the group of first non-IPMI protocol specific managed devices through the first non-IPMI protocol control point and the first communication link, and generate an first IPMI response message through the IPMI message module;
receiving a second non-IPMI protocol response message from the group of second non-IPMI protocol specific managed devices through the second non-IPMI protocol control point and the second communication link, and generate an second IPMI response message through the IPMI message module; and
sending the first IPMI response message and the second IPMI response message back to the original IPMI management request sender.

5. The method of claim 4, wherein the group of first non-IPMI protocol specific managed devices comprises DLNA devices, M2M devices, or POPAI devices, and the group of second non-IPMI protocol specific managed devices comprises DLNA devices, M2M devices, or POPAI devices.

6. An Intelligent Platform Management Interface (IPMI) bridge server configured to expand the management functions of an IPMI control system to a plurality of non-IPMI protocol specific managed devices, the IPMI bridge server comprising:
a processor;
a network interface controller assigned with a network address; and
a memory containing a firmware configured to be, when executed at the processor, in communication with a group of first non-IPMI protocol specific managed devices through a first non-IPMI protocol control point and a first communication link, and a group of second non-IPMI protocol specific managed devices through a second non-IPMI protocol control point and a second communication link, and to receive IPMI management requests each for performing a non-IPMI protocol specific management function at one of the group of first non-IPMI protocol specific managed devices or the group of second non-IPMI protocol specific managed devices;
wherein the firmware comprises:
an IPMI-defined system interface configured to receive a first IPMI message from and transmit a second IPMI message to a local management computer; and
a network interface configured to receive a third IPMI message from and transmit a fourth IPMI message to a remote management computer,
wherein the system interface is separate and independent from the network interface,
wherein each of the IPMI management requests includes data for constructing one of the first and the third IPMI messages in accordance with IPMI communication protocol, the one of the first and the third IPMI messages including at least a protocol specific IPMI OEM command, a device identifier of a selected managed device, and a corresponding protocol command, and a related IPMI OEM command value, and
an IPMI message module that receives the one of the first and the third IPMI messages, extracts the at least the protocol specific IPMI OEM command, and forwards the device identifier, the corresponding protocol command and the related IPMI OEM command value to a management program,
wherein the management program accepts the one of the first and the third IPMI messages, translates the at least the protocol specific IPMI OEM command into a protocol specific command, sends the protocol specific command to the selected managed device and instructs the selected managed device to perform one or more protocol specific management functions, and the management program further receives response from the selected managed device and formulates the response as one of the second and fourth IPMI messages to a corresponding management computer, and
wherein the first communication link is a first bi-directional mobile communication network and the second communication link is a second bi-directional mobile communication network different from the first bi-directional mobile communication network, and each of the first bi-directional mobile communication network and the second bi-directional mobile communication network is selected from a group consisting of a Code Division Multiple Access (CDMA) communication network, a General Packet Radio Service (GPRS) mobile communication network, and a satellite communication network.

7. The IPMI bridge server of claim 6, wherein the firmware is configured to provide communication access for communicating with the group of first non-IPMI protocol specific managed devices and the group of second non-IPMI protocol specific managed devices, and to translate IPMI messages directed to the group of first non-IPMI protocol specific managed devices and the group of second non-IPMI protocol specific managed devices.

8. The IPMI bridge server of claim 7, wherein the firmware further comprises:

a first non-IPMI protocol control point for receiving and transmitting the first non-IPMI protocol communication through the first communication link;

a second non-IPMI protocol control point for receiving and transmitting the second non-IPMI protocol communication through the second communication link;

a device database configured to store a customer management control function table, and property information of the group of first non-IPMI protocol specific managed devices and the group of second non-IPMI protocol specific managed devices;

a SDR configured to store an inventory of the group of first non-IPMI protocol specific managed devices connected through the first communication link and the group of second non-IPMI protocol specific managed devices connected through the second communication link, wherein the management program is configured to manage or perform management functions on the selected managed device according to its own communication protocol; and the IPMI message module is configured to process incoming IPMI messages from and outgoing IPMI messages to the remote management computer and the local management computer.

9. The IPMI bridge server of claim 8, wherein the firmware is configured to determine the selected managed device from the group of first non-IPMI protocol specific managed devices and the group of second non-IPMI protocol specific managed devices based on the customer management control function table and the inventory and property information stored in the device database.

10. The IPMI bridge server of claim 8, wherein the customer management control function table and an inventory and property information are obtained through a discovery and provision process.

11. The IPMI bridge server of claim 6, wherein the each of the IPMI management requests is a fifth IPMI message encapsulated in at least one network packet addressed to the network address; and wherein the firmware is configured to
receive the network packet through the network interface controller and retrieve the fifth IPMI message from the network packet through the IPMI message module; and
receive the network packet through the system interface and retrieve the fifth IPMI message from the network packet through the IPMI message module.

12. The IPMI bridge server of claim 11, wherein each of a first non-IPMI protocol response message and a second non-IPMI protocol response is a non-IPMI protocol specific message encapsulated in at least one network packet addressed to the corresponding IPMI management request sender; and wherein the firmware is configured to
receive a first non-IPMI protocol response message from the group of first non-IPMI protocol specific managed devices through the first non-IPMI protocol control point and the first communication link, and generate an first IPMI response message through the IPMI message module;
receive a second non-IPMI protocol response message from the group of second non-IPMI protocol specific managed devices through the second non-IPMI protocol control point and then second communication link, and generate an second IPMI response message through the IPMI message module; and
send the first IPMI response message and the second IPMI response message back to the original IPMI management request sender.

13. The IPMI bridge server of claim 6, wherein the group of first non-IPMI protocol specific managed devices comprises DLNA devices, M2M devices, or POPAI devices.

14. The IPMI bridge server of claim 6, wherein the group of second non-IPMI protocol specific managed devices comprises DLNA devices, M2M devices, or POPAI devices.

15. A non-transitory computer storage medium having computer-executable instructions stored thereon which, when executed by a processor of an Intelligent Platform Management Interface (IPMI) control system, cause the processor to:
execute a program to be in communication with a group of first non-IPMI protocol specific managed devices through a first non-IPMI protocol control point and a first communication link, and a group of second non-IPMI protocol specific managed devices through a second non-IPMI protocol control point and a second communication link, wherein the program, when executed, defines:
an IPMI-defined system interface configured to receive a first IPMI message from and transmit a second IPMI message to a local management computer; and
a network interface configured to receive a third IPMI message from and transmit a fourth IPMI message to a remote management computer,
wherein the system interface is separate and independent from the network interface; and
receive, at the program and through a network interface controller of the IPMI control system, IPMI management requests each for performing a non-IPMI protocol specific management function at one of the group of first non-IPMI protocol specific managed devices or the group of second non-IPMI protocol specific managed devices,
wherein each of the IPMI management requests includes data for constructing one of the first and the third IPMI messages in accordance with IPMI communication protocol, the one of the first and the third IPMI messages including at least a protocol specific IPMI OEM command, a device identifier of a selected managed device, and a corresponding protocol command, and a related command value, and
an IPMI message module that receives the one of the first and the third IPMI messages, extracts the at least the protocol specific IPMI OEM command, and forwards the device identifier, the corresponding protocol command and the related IPMI OEM command value to a management program,
wherein the management program accepts the one of the first and the third IPMI messages, translates the at least the protocol specific IPMI OEM command into a protocol specific command, sends the protocol specific command to the selected managed device, and instructs the selected managed device to perform one or more protocol specific management functions, and the management program further receives response from the selected managed device and formulates the response as one of the second and fourth IPMI messages to a corresponding management computer, and
wherein the first communication link is a first bi-directional mobile communication network and the second communication link is a second hi-directional mobile communication network different from the first bi-directional mobile communication network, and each of the first bi-directional mobile communication network and the second bi-directional mobile communication network is selected from a group consisting of a Code Division Multiple Access (CDMA) communication network, a General Packet Radio Service (GPRS) mobile communication network, and a satellite communication network.

16. The non-transitory computer storage medium of claim 15, comprising the computer-executable instructions, when executed, cause the processor to:
- receive, at the program, all communication messages directed to the group of first non-IPMI protocol specific managed devices and the group of second non-IPMI protocol specific managed devices through network packets addressed to the same network address;
- handle the network packets addressed to the same network address by the same network interface controller; and
- translate IPMI messages directed to the group of first non-IPMI protocol specific managed devices and the group of second non-IPMI protocol specific managed devices.

17. The non-transitory computer storage medium of claim 16, wherein the each of the IPMI management requests is a fifth IPMI message encapsulated in at least one network packet addressed to the network address; wherein the computer-executable instructions, when executed, cause the processor to:
- receive the network packet through the network interface controller and retrieve the fifth IPMI message from the network packet through the IPMI message module; and
- receive the network packet through the system interface and retrieve the fifth IPMI message from the network packet through the IPMI message module.

18. The non-transitory computer storage medium of claim 17, wherein each of a first non-IPMI protocol response message and a second non-IPMI protocol response is a non-IPMI protocol specific message encapsulated in at least one network packet addressed to the corresponding IPMI management request sender; the computer-executable instructions, when executed, cause the processor to:
- receive a first non-IPMI protocol response message from the group of first non-IPMI protocol specific managed devices through the first non-IPMI protocol control point and the first communication link, and generate an first IPMI response message through the IPMI message module;
- receive a second non-IPMI protocol response message from the group of second non-IPMI protocol specific managed devices through the second non-IPMI protocol control point and the second communication link, and generate an second IPMI response message through the IPMI message module; and
- send the first IPMI response message and the second IPMI response message back to the original IPMI management request sender.

19. The non-transitory computer storage medium of claim 18, wherein the group of first non-IPMI protocol specific managed devices comprises DLNA devices, M2M devices, or POPAI devices, and the group of second non-IPMI protocol specific managed devices comprises DLNA devices, M2M devices, or POPAI devices.

* * * * *